United States Patent
Huang

(10) Patent No.: US 6,494,573 B1
(45) Date of Patent: Dec. 17, 2002

(54) FOLDABLE SPECTACLE FRAME WITH ENGAGING MEANS FOR MAINTAINING THE SPECTACLE FRAME IN UNFOLDED STATE WHILE WEARING

(76) Inventor: David Huang, 4F, No. 335, Sz-Yuan Rd., Shin-Chuang City, Taipei Hsien (TW)

( * ) Notice: Subject to any disclaimer, the term of this patent is extended or adjusted under 35 U.S.C. 154(b) by 0 days.

(21) Appl. No.: 09/952,176

(22) Filed: Sep. 13, 2001

(51) Int. Cl.⁷ .................................................. G02C 5/08
(52) U.S. Cl. .............................. 351/63; 351/153; 2/454
(58) Field of Search ......................... 351/63, 41, 153; 2/454; 16/228

(56) References Cited

U.S. PATENT DOCUMENTS

| | | | |
|---|---|---|---|
| 4,820,035 A | | 4/1989 | Kanda ......................... 351/153 |
| 5,187,504 A | * | 2/1993 | Kanda ........................... 351/63 |

* cited by examiner

Primary Examiner—Hung Xuan Dang

(74) Attorney, Agent, or Firm—Ladas & Parry

(57) ABSTRACT

A foldable spectacle frame having two lens frames forming a plane, two temples which are foldable to a thin form in substantially the same plane as the lens frames without lapping over the lens frames. Each of the temples comprises an auxiliary temple member supported by a pivot provided at an outer portion of the lens frames and being movable about the pivot in an auxiliary plane of pivotal movement substantially orthogonal to the plane of the lens frames, and a main temple member pivoted to the auxiliary temple rotatably in a main plane of pivotal movement orthogonal to the auxiliary plane of pivotal movement of the auxiliary temple member. The spectacle frame further comprises a slide member slidably provided within the auxiliary temple and having a length permitting a base end thereof to project from the auxiliary temple member, and biasing means for biasing the slide member away from the pivot when folding the spectacle frame. The pivot includes engaging means for engaging the slide member with the pivot of the lens frames by cooperation of the slide member, the pivot, and the main temple member. The slide member will engage with the pivot when the main temple member is brought into an unfolded state, and will disengage from the pivot when the main temple member or the auxiliary temple member is folded.

22 Claims, 15 Drawing Sheets

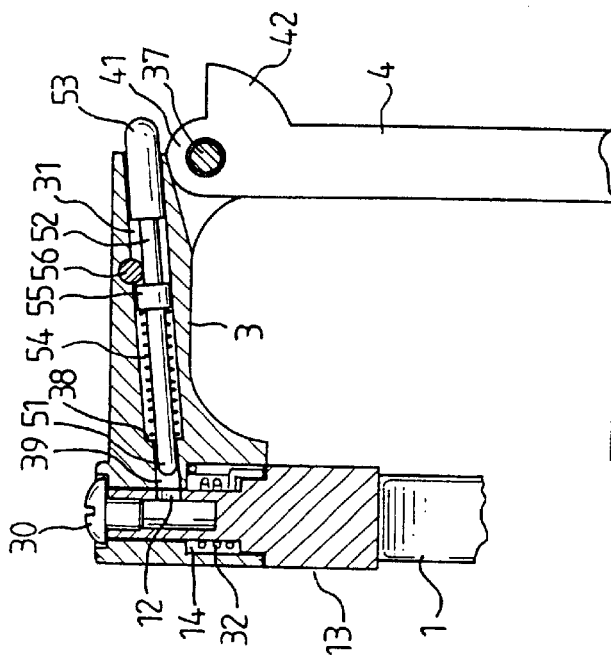
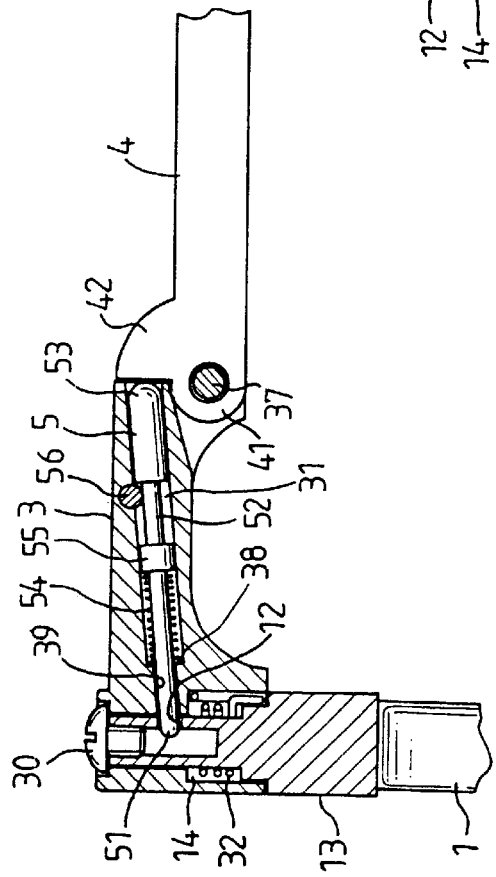

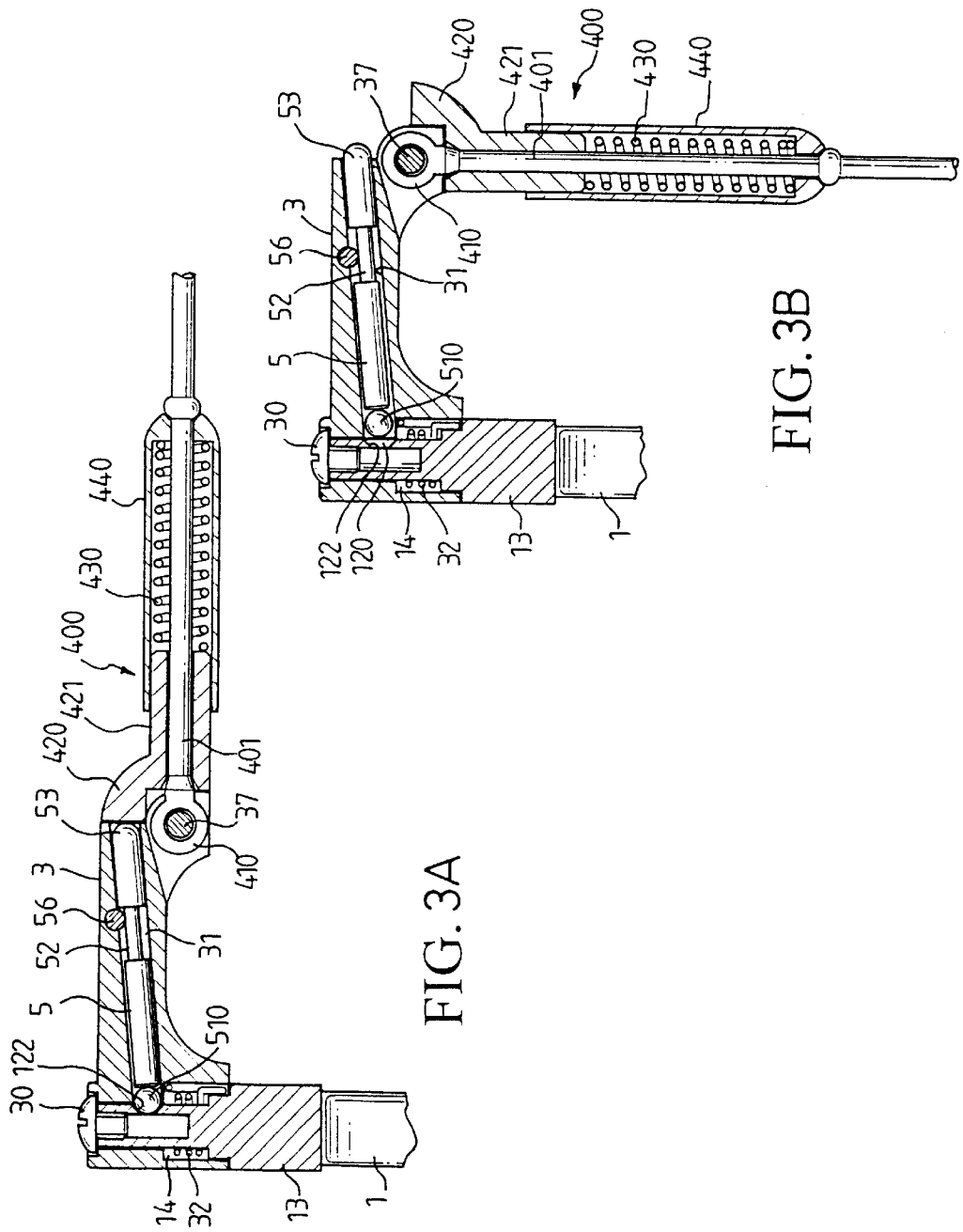

FOLDABLE SPECTACLE FRAME WITH ENGAGING MEANS FOR MAINTAINING THE SPECTACLE FRAME IN UNFOLDED STATE WHILE WEARING

FIELD OF INVENTION

The present invention relates to improvements in foldable spectacle frames.

BACKGROUND OF INVENTION

It is disclosed U.S. Pat. No. 4,820,035 one type of spectacle frame comprising lens frames and temples, wherein the temples are foldable to a thin form in substantially the same plane as the lens frames without lapping over the lens frames, such as shown in FIG. 8.

As shown in FIG. 8, the opposed temples, indicated as 306 and 306a, each comprises an auxiliary temple member 303 and a main temple member 304. The auxiliary temple member 303 which has a length corresponding to a vertical width of the lens frame 301, is supported by an outer portion of upper side 310 of the lens frame and is movable about a pivot 331. in an auxiliary plane of pivotal movement substantially orthogonal to the plane of the lens frame 301. The main temple member 304 is pivoted at a pivot 337 to the auxiliary temple member 303 and movable about the pivot 337 in a main plane of pivotal movement that is orthogonal to the auxiliary plane of pivotal movement of the auxiliary temple member 303.

The auxiliary temple members 303 and the main temple members 304 of the above spectacle frame can be located substantially in the same plane as the lens frames after folding. Accordingly, the spectacle frame has advantage of being foldable to a thickness smaller than common spectacle frames having temples which lap over the lens frames when folded.

With the spectacle frame described, the auxiliary temple member 303 is biased in an unfolding direction by a torsion spring at a location that the auxiliary temple member 303 is pivoted to the lens frame 301. However, the torsion spring is small and low in spring force. Accordingly, when only one of the temples 306, 306a is unfolded, (e.g., the temple 306) and grasped by one hand to wear the spectacles, the angle α1 that each temple in relation to the plane of the lens frames 301 varies owing to the gravity acting on the lens frames 301 as shown in FIG. 8. Thus, the opposed temples 306a, 306 are out of balance with respect to the plane of the lens frames 301, so that the spectacles tilt as shown in FIG. 9 if worn in this state. The spectacles must then be worn again after correcting the unfolded state of the auxiliary temple members 303 with both hands.

An improved foldable spectacle frame is disclosed in U.S. Pat. No. 5,23 1,429 (see FIGS. 11A and 11B) and intends to solve the above problems, wherein the foldable spectacle frame is provided with a slide member 352 that engages with the lens frame 301 when the main temple member 304 is brought into an unfolded state and disengages from the lens frame 301 when the main temple member 304 is folded.

The above solution, however, has encountered difficulty in actual practice since sizes of projections 351 protruded from the slide members 352 and of the recessed portions formed on blocks 313 of the lens frames 301 are limited due to limited space available on the blocks 313. Hence, the projections 351 are liable to damages when users unintentionally or accidentally pivot the auxiliary temple members 303 prior to folding the main temple members 304.

The present invention provides a spectacle frame which is free of the above problems.

SUMMARY OF INVENTION

The present invention provides a foldable spectacle frame comprising two lens frames and two temples, wherein each temple comprises an auxiliary temple member being supported by a pivot provided at an outer portion of the lens frame and being movable about the pivot in an auxiliary plane of pivotal movement that is substantially orthogonal to the plane of the lens frame, and a main temple member pivoted to the auxiliary temple member rotatably in a main plane of pivotal movement that is orthogonal to the auxiliary plane of pivotal movement of the auxiliary temple member. The spectacle frame further comprises a slide member slidably provided within the auxiliary temple member and having a length permitting a base end thereof to project from the auxiliary temple member, and biasing means for biasing the slide member in a direction away from the pivot when folding the spectacle frame, wherein the pivot includes engaging means for engaging the slide member with the pivot by cooperation of the slide member, the pivot, and the main temple member. The slide member engages with the pivot when the main temple member is brought into an unfolded state and disengages from the pivot when the main temple member or the auxiliary temple member is folded.

The advantages and features of this invention can be easily comprehended by persons skilled in the art through the drawings and detailed explanations.

BRIEF DESCRIPTION OF DRAWINGS

FIG. 2A is a sectional view showing the slide member of FIG. 2 engaging the pivot as being pushed in by unfolding the main temple member;

FIG. 2B is a sectional view showing the slide member of FIG. 2 disengaging from the pivot by folding the main temple member;

FIG. 3A is a sectional view showing the slide member of FIG. 3 engaging the pivot as being pushed in by unfolding the main temple member;

FIG. 3B is a sectional view showing the slide member of Fir. 3 disengaging from the pivot by folding the auxiliary temple member;

FIG. 4B is a sectional view showing the slide member of FIG. 4 disengaging from the pivot by folding the main temple member;

DETAILED DESCRIPTIONS OF EMBODIMENTS

Figure 1:
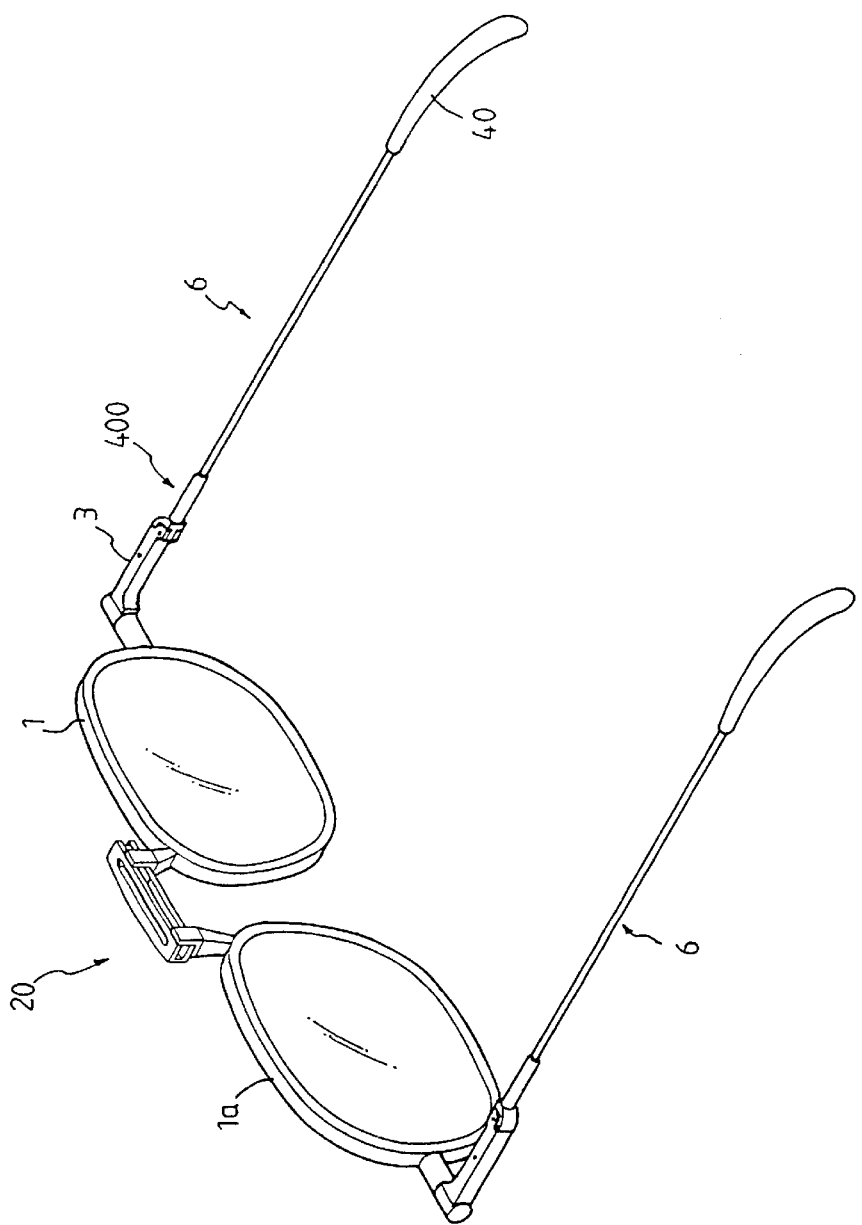
FIG. 1 is a perspective view of a spectacle frame embodying the invention.

The present invention will be described below in detail with reference to the embodiments shown in the drawings.

With reference to FIG. 1, a spectacle frame includes two temples 6 and two lens frames 1, 1a that lie in a plane of lens frame and are in opposed relation.

One lens frame 1 includes a bridge piece 22 and the other lens frame 1a includes a guide 23 that is slidably fitted in the bridge piece 22 to interconnect the two lens frames 1, 1a. The bridge piece 22 is formed with a slot 24 and a pin 25 passing through the slot 24 and inserted into the guide 23 for preventing the guide 23 from slipping off, such that the two lens frames 1, 1a are slidable towards each other. When spaced apart by the largest distance, the lens frames 1, 1a are positioned in place for the respective pupils of the wearer.

Figure 2:
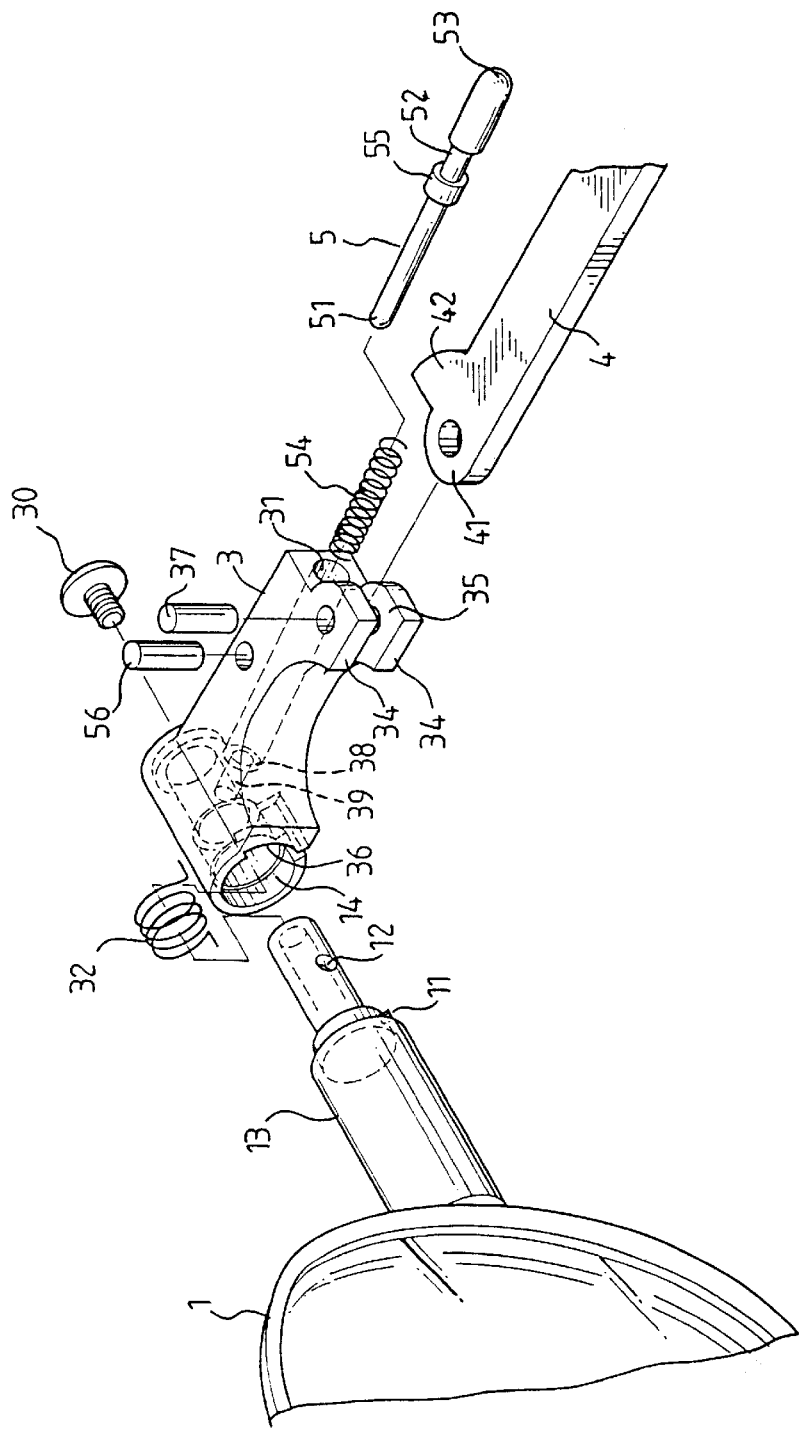
FIG. 2 is an exploded perspective view of a first embodiment showing the pivoting structure of the invention.

See FIG. 2, temples 6 extending from the respective lens frames 1, 1a are each pivotal at two locations, i.e., at pivots 13 and 37, and folded in substantially the same plane as the lens frames 1, 1a. In the specification, the temple 6 extending from lens frame 1 is exemplified to explained the preferred embodiments of this invention; it should be understood that another temple 6 extending from 1a is symmetrical to the temple 6 in construction.

As shown in FIGS. 1 and 2, the temples 6 each comprise an auxiliary temple member 3 and a main temple member 4 having a free end provided with an end piece 40.

In this embodiment, the auxiliary temple member 3 is formed with an axial bore 31 having a circular cross section and opposite open ends, and a horizontal bore 14 that is orthogonal to and in communication with the axial bore 31 through a through hole 39. A slide member 5 is provided in the axial bore 31. The pivot 13 extends from an outer side of the lens frame and is perpendicular to a lengthwise direction of the auxiliary temple member 303. The auxiliary temple member 3 has a length that is substantially equivalent to a distance extending from the pivot 13 to a lower edge of the lens frame 301.

The pivot 13 is loosely inserted through the horizontal bore 14 and prevented from slipping off by a screw 30, such that the auxiliary temple member 3 is movable about the pivot 13 in an auxiliary plane of pivotal movement that is substantially orthogonal to the plane of the lens frame.

A torsion spring 32 is disposed around the pivot 13 in the horizontal bore 14. The torsion spring 32 has one end attached to the pivot 13 and the other end engaged with the auxiliary temple member 3 for biasing the auxiliary temple member 3 in an unfolding direction.

The auxiliary temple member 3 has an abutting recess 36 at a forward end of the horizontal bore 14 to abut against a stop 11 provided on the pivot 13. Cooperation of the abutting recess 36 and the stop 11 limits the rotational angle of the auxiliary temple member 3 with respect to the lens frame 1 between a folding state and an unfolding state, and aligns the auxiliary temple member 3 with the pivot 13 when at the unfolding state.

The pivot 13 is formed with a cylindrical aperture 12 to act as engaging means, at a location that is engageable with the slide member 5 provided in the axial bore 31 when the auxiliary temple member 3 is at the unfolding state.

Two brackets 34 are formed on a side face of the free end of the auxiliary temple member 3. The main temple member 4 has a base end provided with a joint lug 41. With the joint lug 41 fitted in a groove 35 between the brackets 34, the pivot 37 supports the main temple member 4 movably in a main plane of pivotal movement that is orthogonal to the auxiliary plane of pivotal movement of the auxiliary temple member 3 and that includes axis of the auxiliary temple member 3. The main temple member 4 is further formed with a projection 42 to act as moving means, adjacent the joint lug 41 for moving the slide member 5 towards the pivot 13 when the main temple member 4 is at the unfolding state.

As seen in FIG. 2, the slide member 5 is slidably fitted in the axial bore 31 of the auxiliary temple member 3 and has a tip 51, at a forward end, engageable with the aperture 12 of the pivot 13. A base end 53 of the slide member 5 projects from the free end of the auxiliary temple member 3.

A pin 56 for restraining sliding movement of the slide member 5 is inserted in a side of the auxiliary temple member 3 and slidably fitted next to a recessed portion 52 formed on the slide member 5 between the base end 53 of the slide member 5 and an enlarged portion 55 formed on a waist of the slide member 5, so as to restrain the slide member 5 to be slidable between an engaging position and a disengaging position.

In the embodiment shown in FIGS. 2, 2A, and 2B, a compression spring 54 acting as biasing means is disposed around the slide member 5 in the axial bore 13 of the auxiliary temple member 3. The compression spring 54 has one end urging against a junction 38 formed between the axial bore 31 and the through hole 39, and the other end urging against the enlarged portion 55 of the slide member 5.

When the main temple member 4 is unfolded and the slide member 5 is at the disengaging position, the projection 42 will press against the base end 53 of the slide member 5 that projects from the free end of the auxiliary temple member 3 in the course of the unfolding movement to move the slide member 5 towards the pivot 13 to engage with the aperture 12 formed on the pivot 13 (see FIG. 2A). When the main temple member 4 is folded and the slide member 5 is at the engaging position, the compression spring 54 will bias the slide 5 member 5 to disengage from the aperture 12.

The spectacles are accommodated as folded in a spectacle case (not shown). When the case is opened, each auxiliary temple member 3 will be automatically unfolded by the force of the torsion springs 32. The auxiliary temple member 3 is unfolded until the abutting recess 36 encounters the stop 11 to align the through hole 39 of the auxiliary temple member 3 with the aperture 12 of the pivot 13.

When the main temple member 4 is unfolded in this state, the projection 42 will press against the base end 53 of the slide member 5 to move the slide member 5 towards the pivot 13. This engages the tip 51 of the slide member 5 with the aperture 12 of the pivot 13 to lock the auxiliary temple member 3 in the unfolded state. Even if handled by one hand, the opposed temples 6 will not be unfolded at different angles when the spectacles are to be worn. This eliminates the likelihood that the spectacles will be worn as tilted. Furthermore, due to the greater space available on the pivot 13, the size of the tip 51 can be maximized to enhance strength and rigidity of the slide member 5 such that the user can hardly fold the auxiliary temple member 3 when the main temple member 4 is still unfolded so as to avoid damaging the slid member 5, unlike the conventional spectacle frames.

When the main temple member 4 is folded, the compression spring 54 will bias the slide member 5 to disengage from the aperture 12. This permits the auxiliary temple member 3 to freely move pivotally for folding, with the result that the auxiliary temple member 3 and the main temple member 4 can be folded in substantially a same plane as the lens frame 1.

Figure 3:
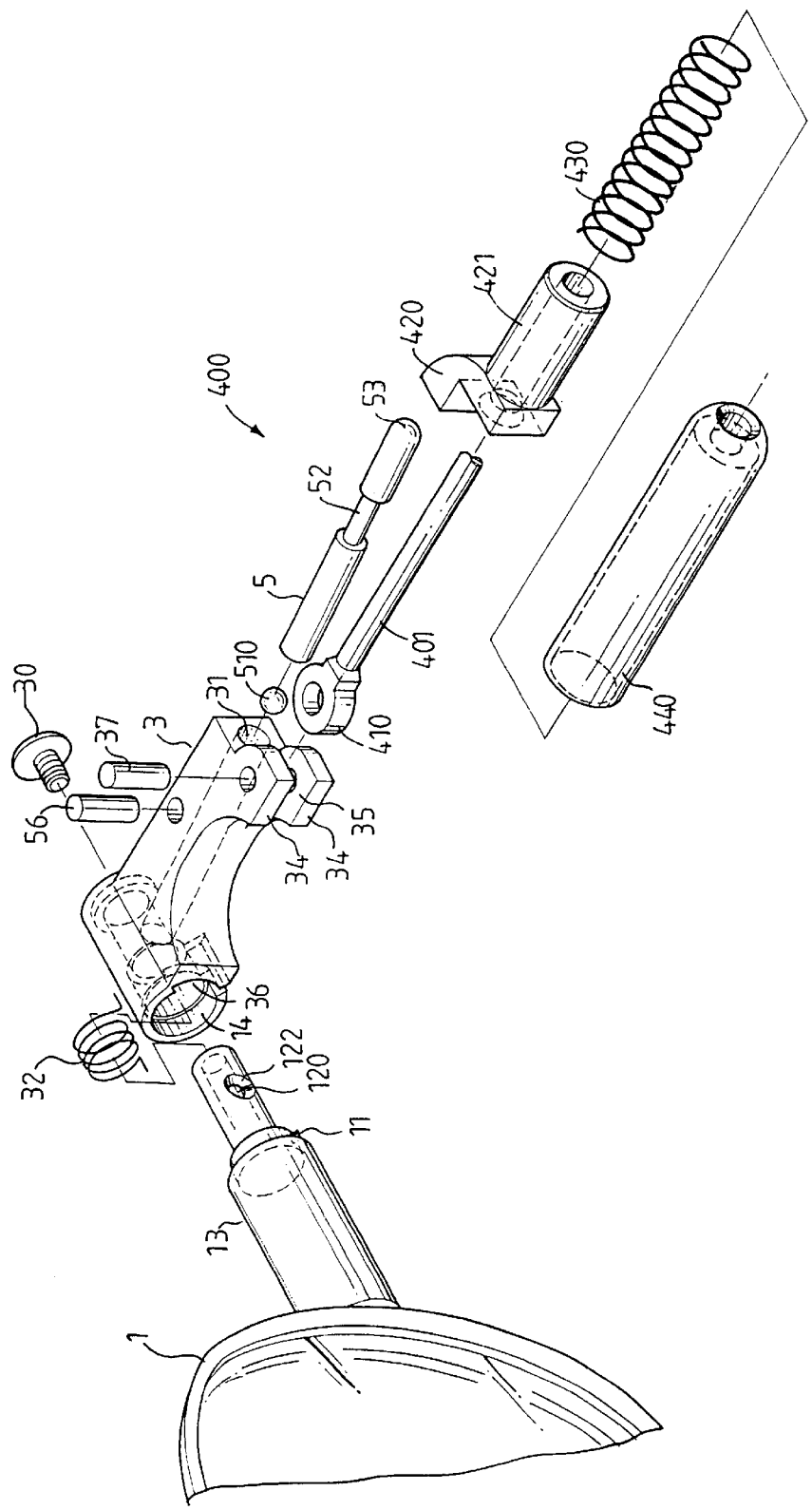
FIG. 3 is an exploded perspective view of another embodiment showing the pivoting structure of the invention.

FIGS. 3, 3A and 3B show another embodiment wherein a ball 510 is provided at the forward end of the slide member 5 and the pivot 13 is formed with a semi-spherical aperture 120 having a semi-spherical profile 122 conforming to the ball 150 to act as engaging means, wherein the semispherical profile 122 acts as biasing means, at a location that is engageable with the ball 510 when the auxiliary temple member 3 is at the unfolding state. In this embodiment, when the auxiliary temple member 3 is folded after folding the main temple member 400, the semi-spherical profile 122 of the aperture 120 will urge the ball 510 to disengage from the semi-spherical aperture 12. Thus, the embodiment has the same advantage as already described.

The spectacle frame of this invention may further embodies a flexible main temple member 400, as shown in FIGS. 3, 3A and 3B, wherein flexible main temple member 400 includes a core 401, an inner tube piece 421 disposed around core 401, a main temple compression spring 430 disposed around the core 401 next to the inner tube piece 421, and an outer tube piece 440 disposed around the main temple compression spring 430 for preventing the main temple compression spring 430 from slipping off. The core 401 has a base end provided with a joint lug 410 fitted in the groove 35 between the brackets 34. The inner tube piece 421 is formed with a projection 420 to act as moving means, adjacent the joint lug 41 for moving the slide member 5 towards the pivot 13 when the main temple member 4 is at the unfolding state.

When the flexible main temple member 400 is unfolded, the projection 420 will press against the base end 53 of the slide member 5 to move the slide member 5 towards the pivot 13. This engages the tip 51 or the ball 510 with the aperture 12 or 120 to lock the auxiliary temple member 3 in the unfolded state. In case that excessive force is applied to unfold the flexible main temple member 400, the projection 420 acts on the auxiliary temple member 3 and subsequently causes compression of the main temple compression spring 430, which then counteracts and returns the flexible main temple member 400 to a proper state.

Figure 4:
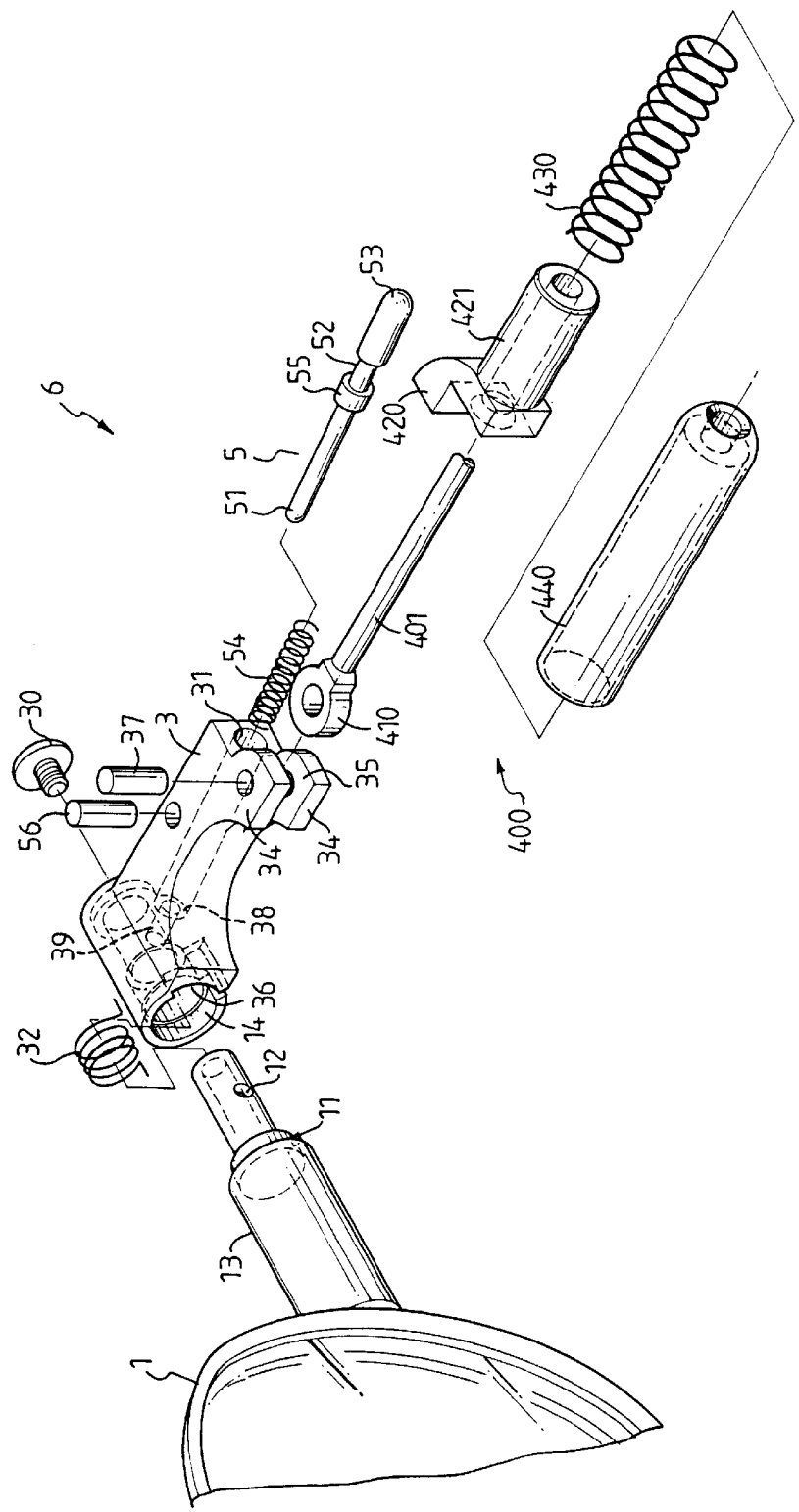
FIG. 4 is an exploded perspective view of further embodiment showing the pivoting structure of the invention which embodies a flexible main temple member, FIG. 4A. is a sectional view showing the slide member of FIG. 4 engaging the pivot as being pushed in by unfolding the main temple member.
Figures 4A, 4B:
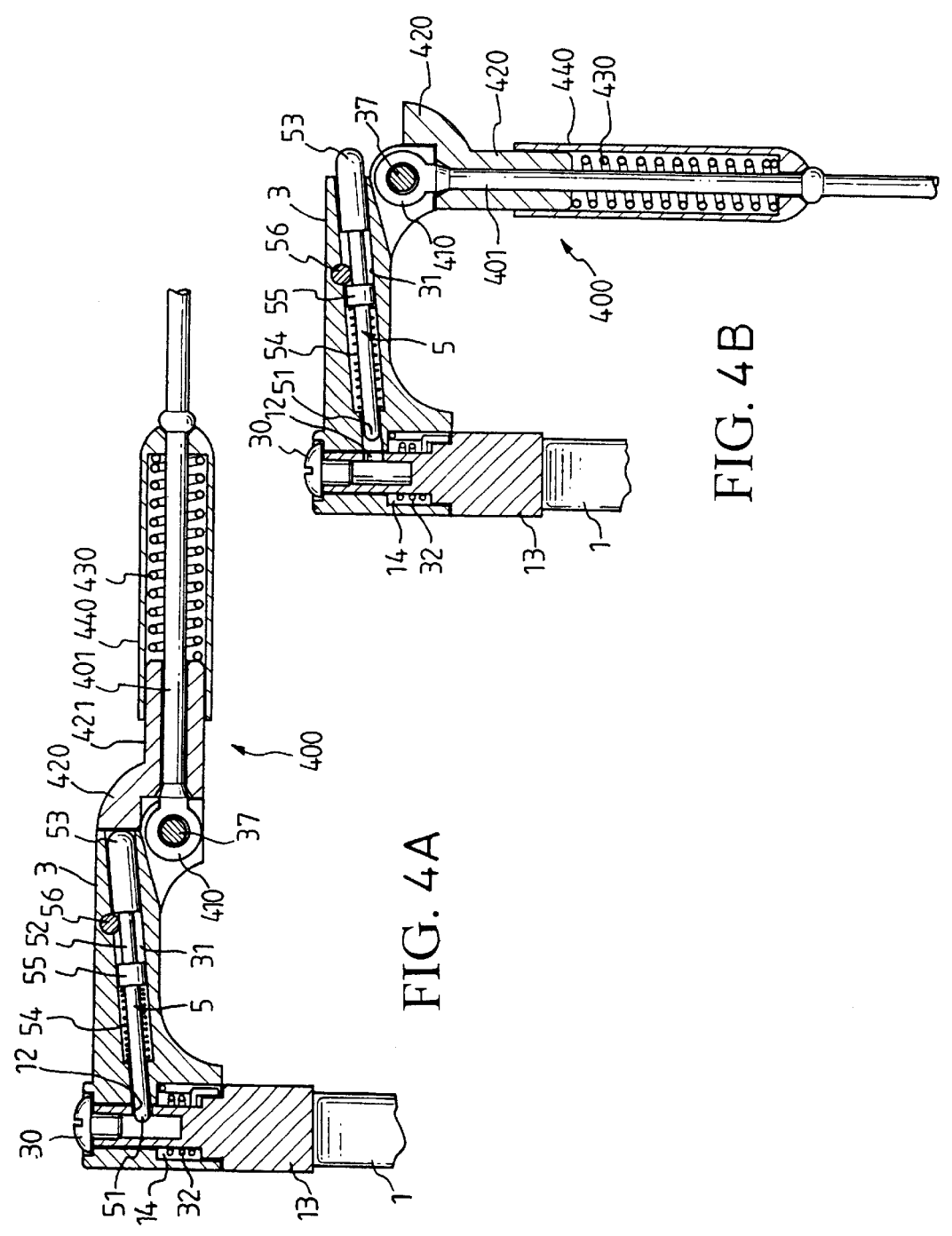

FIGS. 4, 4A, and 4B shows the flexible main temple member 400 being embodied in the embodiment of FIG. 2.

Figure 5:
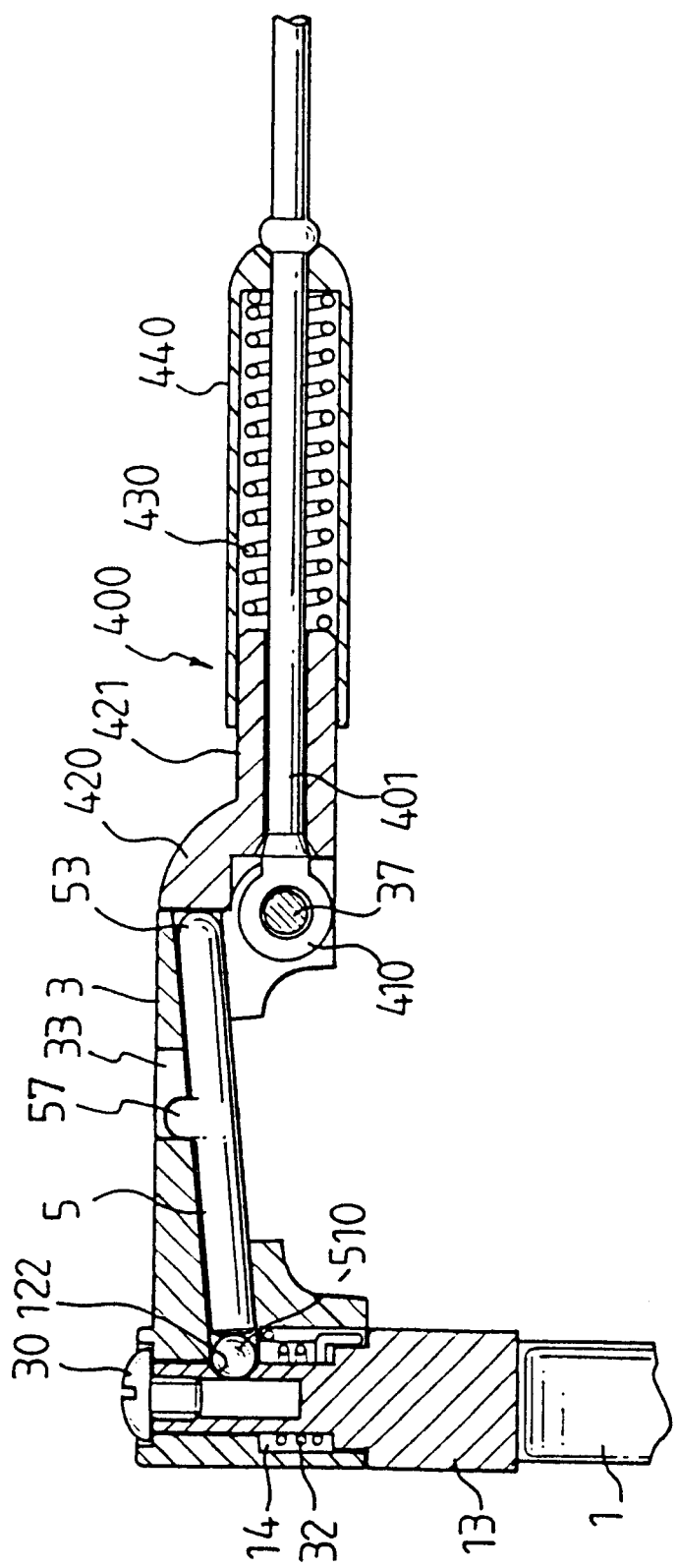
FIG. 5 is a sectional view of a further embodiment of this invention, showing the slide member engaging the pivot as being pushed in by unfolding the main temple member.

FIG. 5 is a sectional view of a further embodiment of this invention wherein the slide member 5 includes a projection 57 provided at a waist portion thereof, to cooperate with a cavity 33 formed at a lateral side of the auxiliary temple member 3. The cavity 33 and the projection 57 jointly retrain the slide member 5 to be slidable between an engaging position and a disengaging position.

Figure 6:
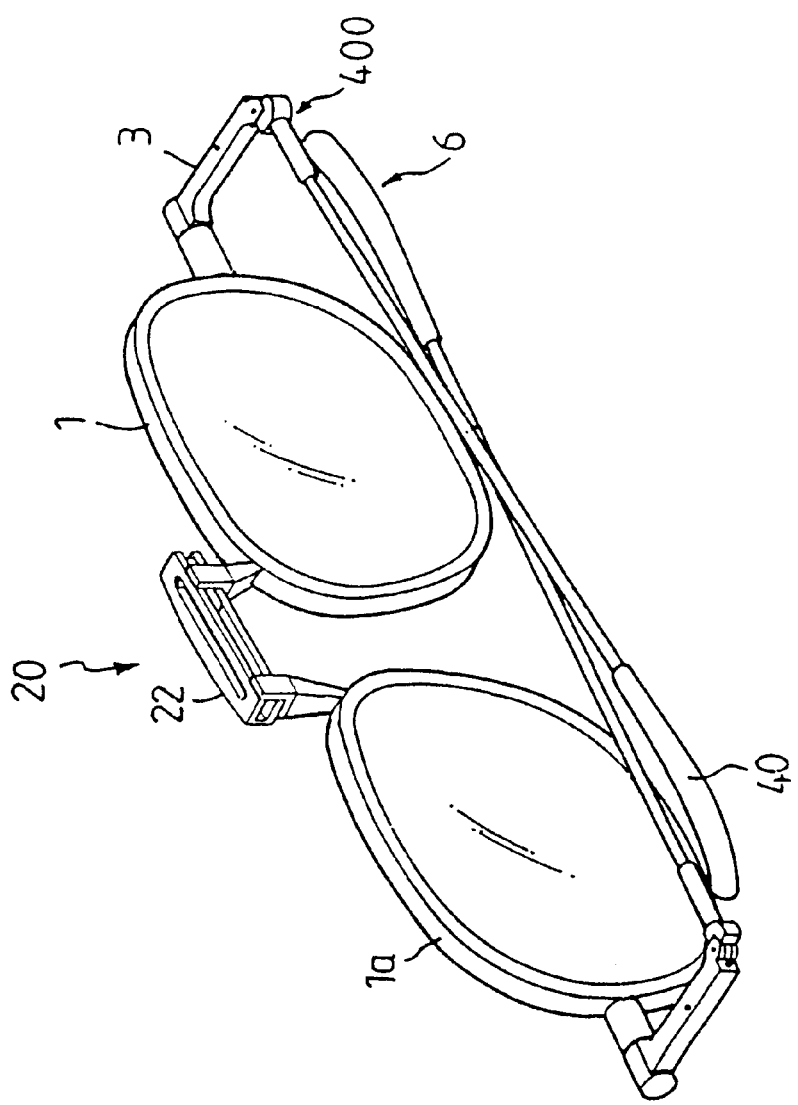
FIG. 6 is a perspective view showing the main temple member being pivoted in a main plane of pivotal movement that is substantially orthogonal to the plane of the lens frames.
Figure 7:
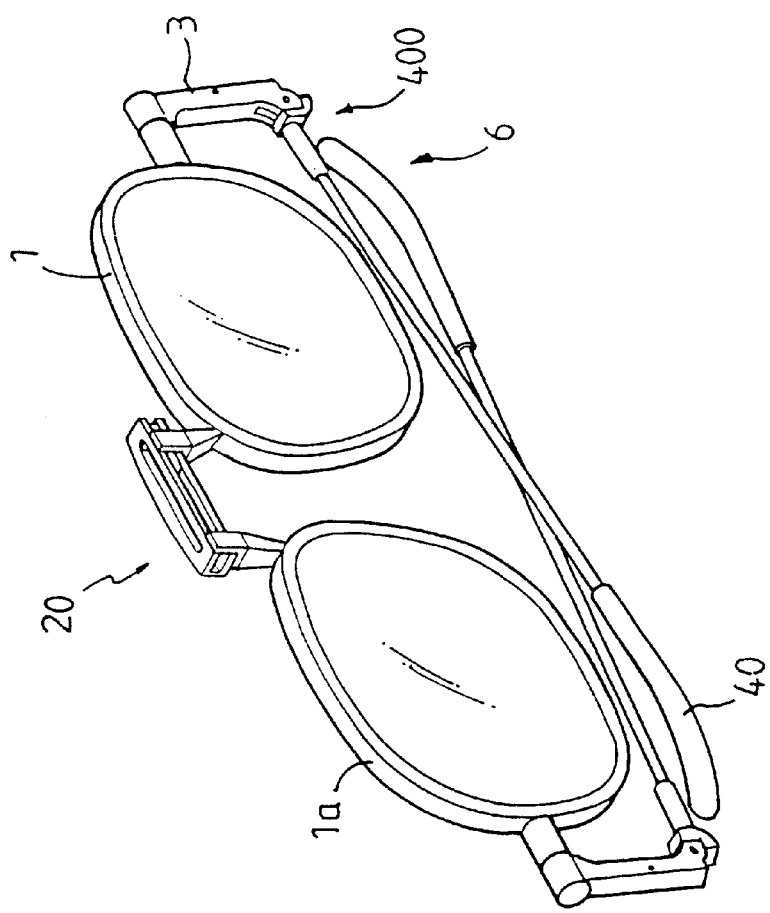
FIG. 7 is a perspective view showing the auxiliary temple member being pivoted in an auxiliary plane of pivotal movement that is orthogonal to the main plane of pivotal movement of the main temple member.
Figure 8:
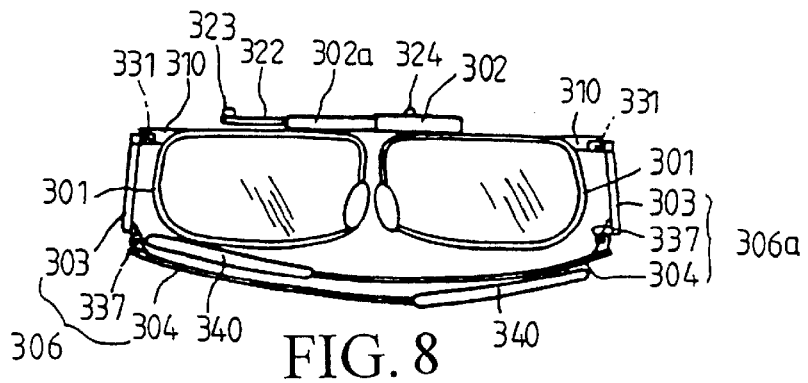
FIG. 8 is a plan view of prior art foldable spectacle frames wherein temples are folded in substantially the same plane as lens frames.
Figure 9:
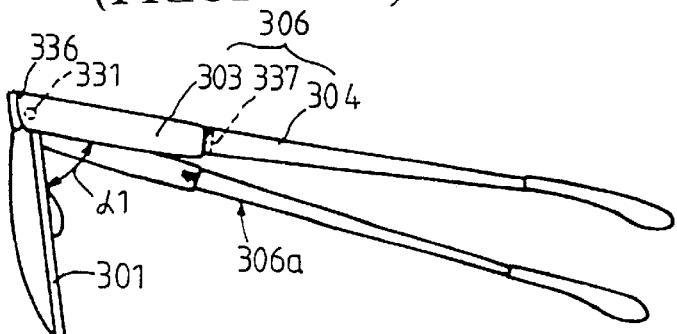
FIG. 9 is a side elevation of prior art showing the two temples as positioned at different angles with respect to the plane of the lens frames.
Figure 10:
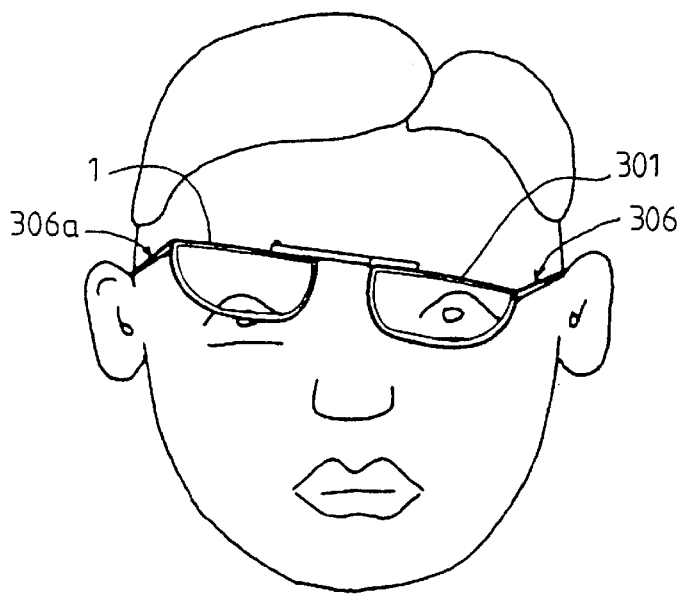
FIG. 10 is a front view of prior art showing tilted spectacles with the temples positioned at the different angles.
Figure 11A:
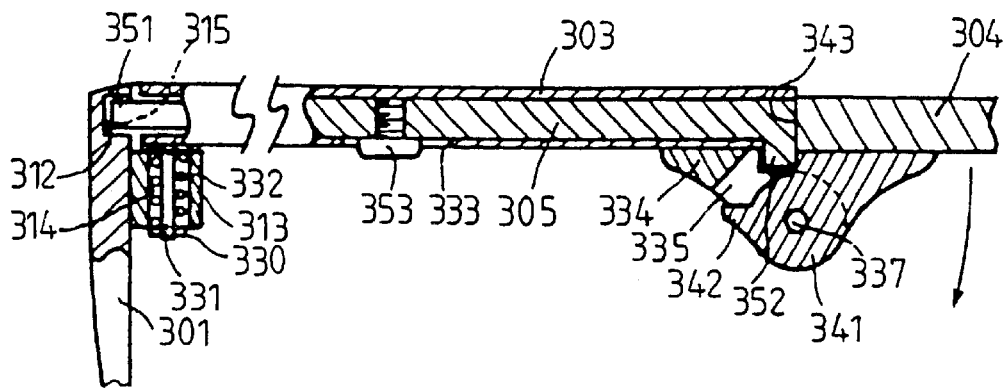
FIG. 11A is a sectional view of prior art showing the slide member as pushed in by unfolding the main temple member.
Figure 11B:
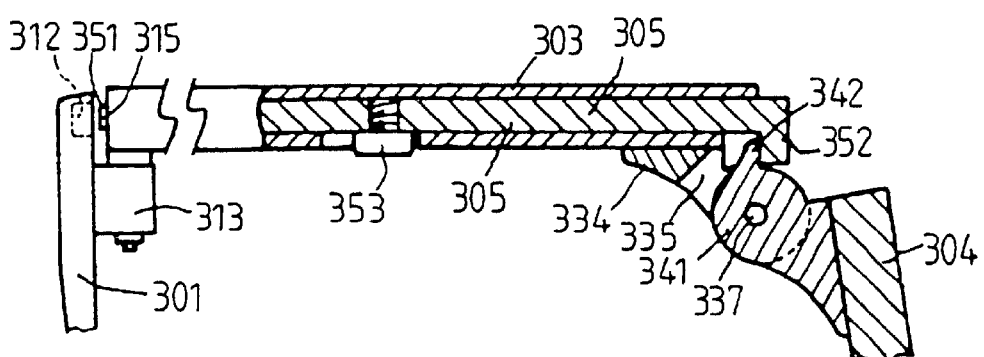
FIG. 11B is a sectional view of the prior art in FIG. 11A showing the slide member disengaging from the spectacles by folding the main temple member.
Figure 12:
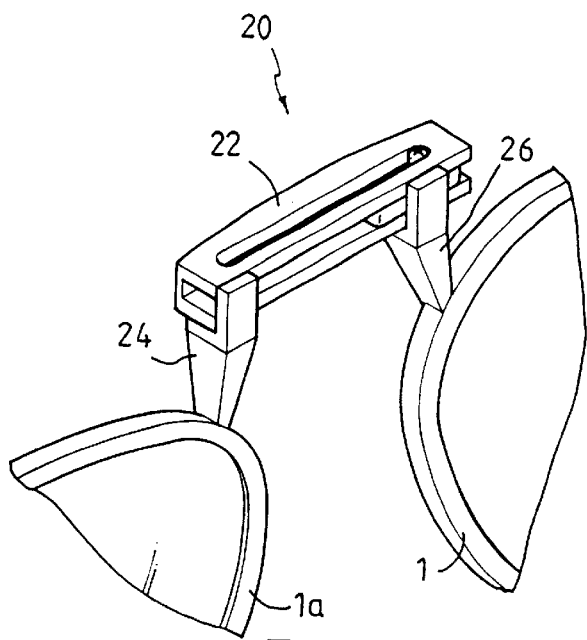
FIG. 12 is a fragmentary view, on enlarged scale, of the bridge of the spectacle frame of FIG. 1.
Figure 14:
FIG. 14 is a side view of FIG. 12.
Figure 13:
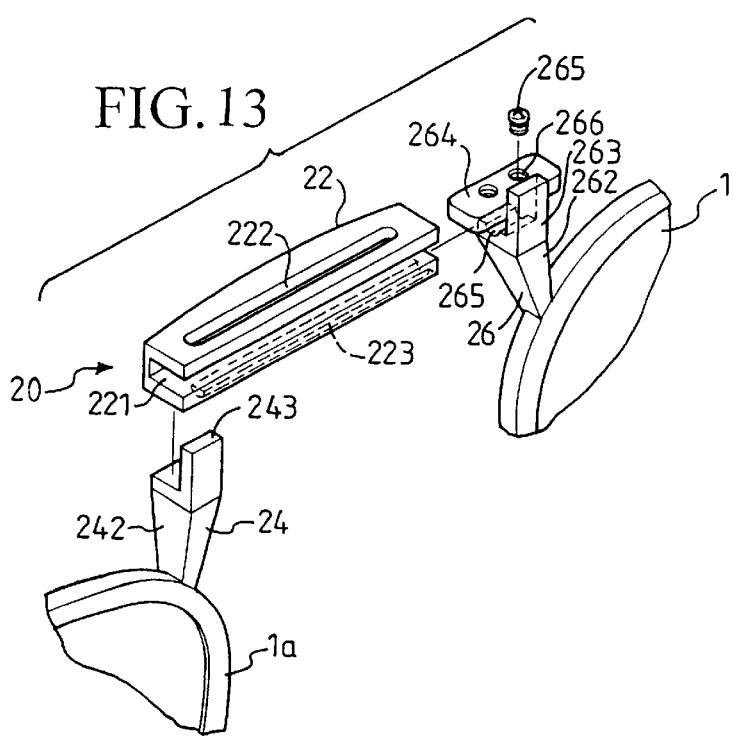
FIG. 13 is an exploded view of the bridge of FIG. 12.
Figure 15:
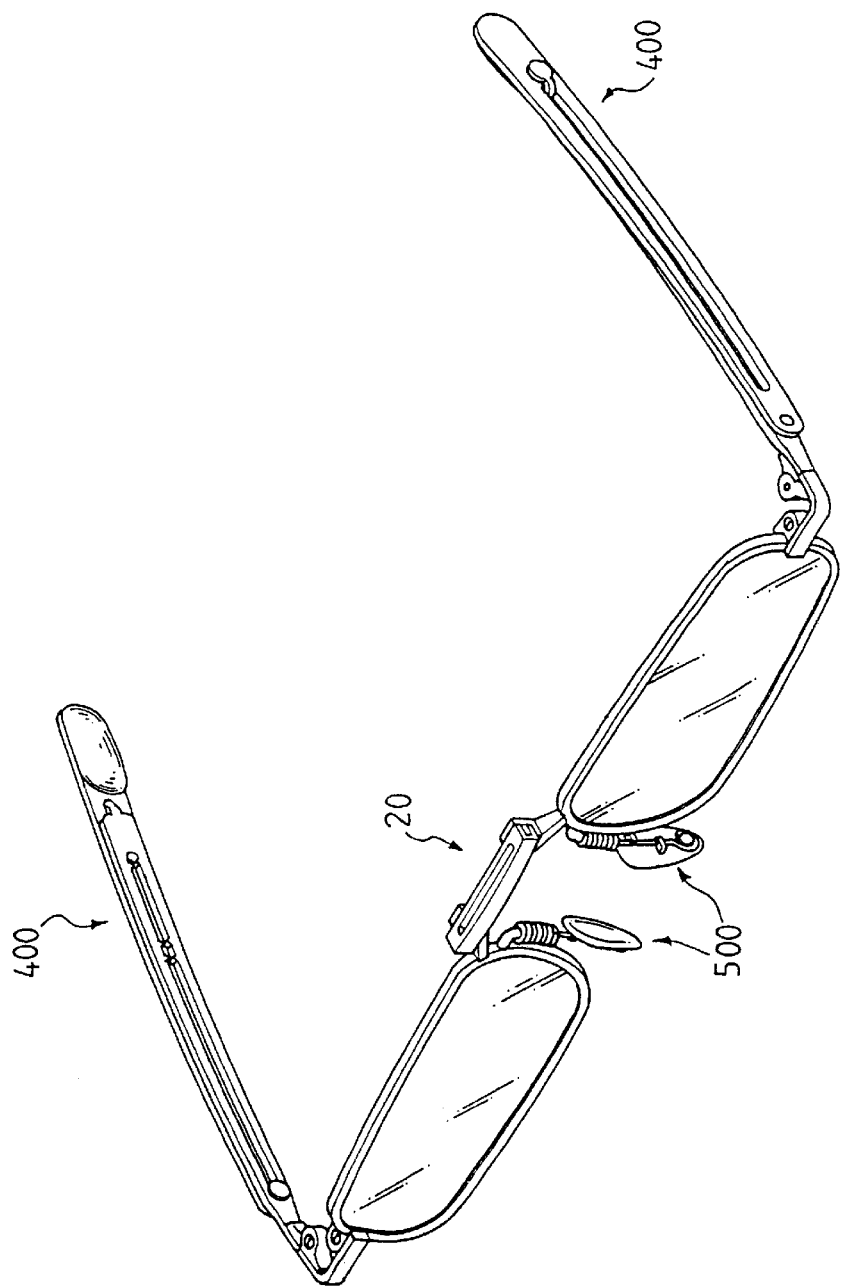
FIG. 15 is a prespective view of a modified frame.
Figure 16:
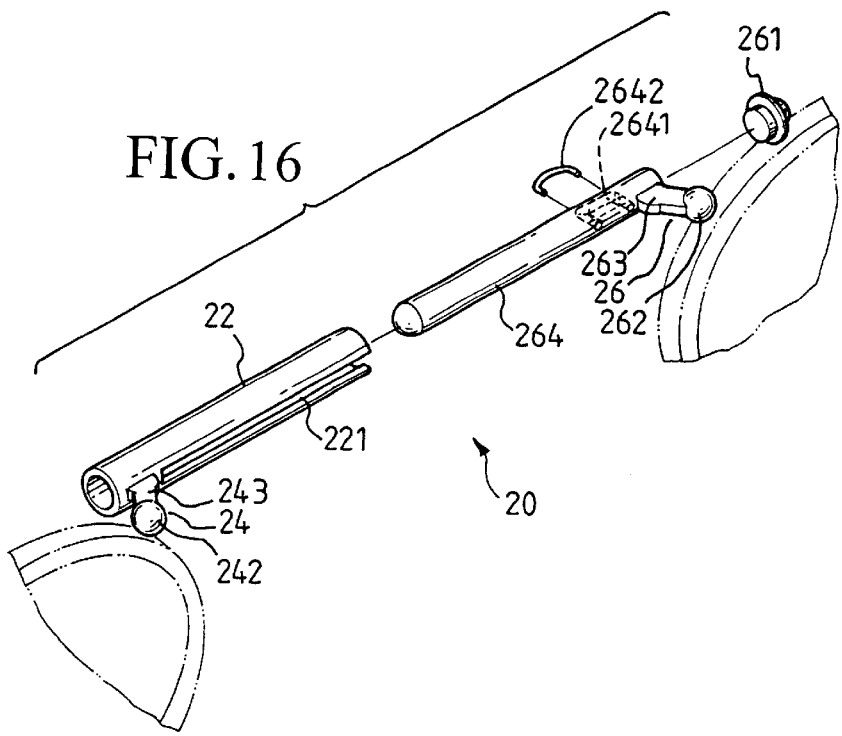
FIG. 16 is an expolded view similiar to FIG. 13 of a modified bridge.
Figure 17:
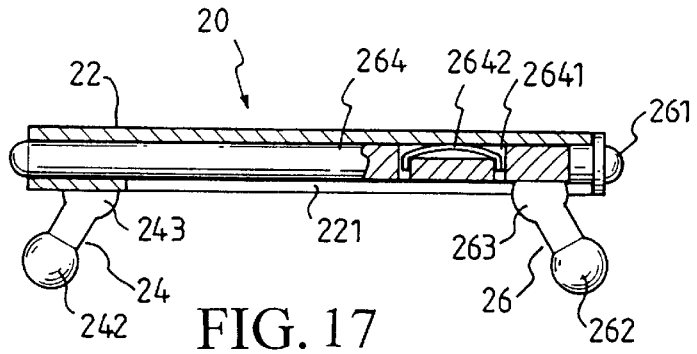
FIG. 17 is a sectional view through the bridge of FIG. 16 in contracted state.
Figure 18:
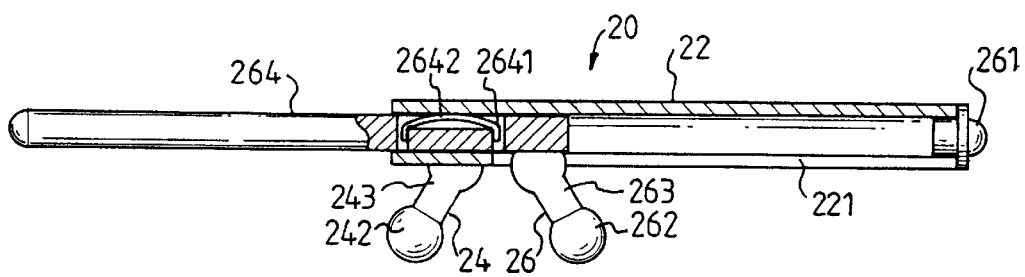
FIG. 18 is a view similiar to FIG. 17 in which the bridge is in expanded state.

FIG. 6 is a perspective view showing the flexible temple member 400 being pivoted in a main plane of pivotal movement that is substantially orthogonal to the plane of the lens frames; and FIG. 7 is a perspective view showing the auxiliary temple member 3 being pivoted in an auxiliary plane of pivotal movement that is orthogonal to the main plane of pivotal movement of the main temple member 400.

The construction characteristics of the present invention are preferably incorporated into spectacle frames having opposite lens frames 1, 1a which are movable toward or away from each other (see FIGS. 1 and 7) because the spectacle frames of this type can be carried about as compacted to the greatest possible extent. However, the invention can of course be embodied as usual spectacle frames wherein the opposite lens frames are fixed to a bridge.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A foldable spectacle frame having two lens frames which lie in a plane of lens frames and are connected in opposed relation by a bridge, and two temples which are foldable to a thin form in substantially the same plane as the lens frames without lapping over the lens frames, each of the temples comprising:

an auxiliary temple member supported by a pivot including engaging means, the pivot being provided at an outer portion of the respective lens frame, the auxiliary temple member being movable about the pivot in an auxiliary plane of pivotal movement substantially orthogonal to the plane of the lens frame, the auxiliary temple being movable between a folding state and an unfolding state, wherein the auxiliary temple member has a length that is substantially equivalent to a distance extending from the pivot to a lower edge of the lens frame;

a main temple member pivoted to the auxiliary temple member at a pivotal end thereof and being rotatable in a main plane of pivotal movement orthogonal to the auxiliary plane of pivotal movement of the auxiliary temple member, the main temple being rotatable between a folding state and an unfolding state;

moving means provided at the pivotal end of the main temple member;

a slide member slidably provided within the auxiliary temple and having a length permitting a base end thereof to project from the auxiliary temple member, the slide member being slidable between an engaging position and a disengaging position, and engageable with the engaging means of the pivot when the auxiliary temple member is at the unfolding state;

biasing means for biasing the slide member away from the pivot when folding the spectacle frame;

whereby the moving means will move the slide member to engage with the engaging means of the pivot from the disengaging position to the engaging position when the main temple member is brought into the unfolded state, and the biasing means disengages the slide member from the pivot at the engaging position when folding the spectacle frame.

2. The foldable spectacle frame according to claim 1, wherein the slide member is formed with a an enlarged portion on a waist thereof and a recessed portion on a side between the enlarged portion and the base end of the slide member, through the recessed portion a pin is inserted for restraining sliding movement of the slide member.

3. The foldable spectacle frame according to claim 1, wherein the moving means is a projection formed at the pivotal end of the main temple member.

4. The foldable spectacle frame according to claim 1, wherein the engaging means is a cylindrical aperture formed on the pivot for engaging with a forward end of the slide member and the biasing means is a compression spring disposed around the slide member in the axial bore of the auxiliary temple member.

5. The foldable spectacle frame according to claim 1, further comprising a ball provided at a forward end of the slide member, and wherein the engaging means is a semi-spherical aperture having a semi-spherical profile conforming to the ball, and formed on the pivot for engaging with the ball, and the biasing means is semi-spherical profile of the semi-spherical aperture.

6. The foldable spectacle frame according to claim 1, wherein the slide member includes a projection provided at a waist portion thereof, to cooperate with a cavity formed at a lateral side of the auxiliary temple member for receiving the projection, so as to retrain sliding movement of the slide member.

7. A foldable spectacle frame having two lens frames which lie in a plane of lens frames and are connected in opposed relation by a bridge, and two temples which are foldable to a thin form in substantially the same plane as the lens frames without lapping over the lens frames, each of the temples comprising:

an auxiliary temple member supported by a pivot including an aperture, the pivot being provided at an outer portion of the respective lens frame, the auxiliary temple member being movable about the pivot in an auxiliary plane of pivotal movement substantially orthogonal to the plane of the lens frame, the auxiliary temple being movable between a folding state and an unfolding state, wherein the auxiliary temple member has a length that is substantially equivalent to a distance extending from the pivot to a lower edge of the lens frame;

a main temple member pivoted to the auxiliary temple member at a pivotal end thereof and being rotatable in a main plane of pivotal movement orthogonal to the auxiliary plane of pivotal movement of the auxiliary temple member, the main temple being rotatable between a folding state and an unfolding state, the main temple member being formed with a projection at the pivotal end thereof;

a slide member slidably provided within the auxiliary temple and having a length permitting a base end thereof to project from the auxiliary temple member, the slide member being slidable between an engaging position and a disengaging position, and engageable with the aperture of the pivot when the auxiliary temple member is at the unfolding state;

and a ball provided at a forward end of the slide member for engaging with the aperture, and wherein the aperture has a semi-spherical profile conforming to the ball for biasing the slide member away from the pivot when folding the spectacle frame;

whereby the projection will move the slide member to engage with the aperture of the pivot from the disengaging position to the engaging position when the main temple member is brought into the unfolded state, and the spherical profile subjects the ball to disengage the slide member from the pivot at the engaging position when folding the spectacle frame.

8. The foldable spectacle frame according to claim 7, wherein the auxiliary temple member is formed with an axial bore and opposite open ends, and a horizontal bore that is orthogonal to and in communication with the axial bore, the slide member is provided in the axial bore, and the pivot is loosely inserted through the horizontal bore, wherein the pivot is prevented from slipping off the horizontal bore by a screw.

9. The foldable spectacle frame according to claim 8, further comprising a torsion spring disposed around the pivot in the horizontal bore, the torsion spring having one end attached to the pivot and the other end engaged with the auxiliary temple member for biasing the auxiliary temple member in an unfolding direction.

10. The foldable spectacle frame according to claim 9, wherein the pivot is provided with a stop and the auxiliary temple member is formed with an abutting recess at a forward end of the horizontal bore for abutting against the stop such that the stop will limit pivotal movement of the auxiliary temple member between the folding and unfolding states and aligns the axial bore of the auxiliary temple member with the aperture when the auxiliary temple is at the unfolding state.

11. The foldable spectacle frame according to claim 10, wherein the horizontal bore that is in communication with the axial bore through a through hole, the compression spring has one end urging against a junction between the axial bore and the through hole, and the other end urging against the enlarged portion of the slide member.

12. The foldable spectacle frame according to claim 7, wherein the slide member is formed with a an enlarged portion on a waist thereof and a recessed portion on a side between the enlarged portion and the base end of the slide member, through the recessed portion a pin is inserted for restraining sliding movement of the slide member.

13. The foldable spectacle frame according to claim 7, wherein the main temple member includes a core pivoted to the auxiliary temple member, an inner tube piece disposed around core, a compression spring disposed around the core next to the inner rube piece, and an outer tube piece disposed around the compression spring for preventing the compression spring from slipping off, the projection being formed on the inner tube piece for moving the slide member towards the pivot when the main temple member is at the unfolding state.

14. The foldable spectacle frame according to claim 7, wherein the slide member includes a projection provided at a waist portion thereof, to cooperate with a cavity formed at a lateral side of the auxiliary temple member for receiving the projection, so as to retrain sliding movement of the slide member.

15. A foldable spectacle frame having two lens frames which lie in a plane of lens frames and are connected in opposed relation by a bridge, and two temples which are foldable to a thin form in substantially the same plane as the lens frames without lapping over the lens frames, each of the temples comprising:

an auxiliary temple member supported by a pivot including an aperture, the pivot being provided at an outer portion of the respective lens frame, the auxiliary temple member being movable about the pivot in an auxiliary plane of pivotal movement substantially orthogonal to the plane of the lens frame, the auxiliary temple being movable between a folding state and an unfolding state, wherein the auxiliary temple member has length that is substantially equivalent to a distance extending from the pivot to a lower edge of the lens frame;

a main temple member pivoted to the auxiliary temple member at a pivotal end thereof and being rotatable in a main plane of pivotal movement orthogonal to the auxiliary plane of pivotal movement of the auxiliary temple member, the main temple being rotatable between a folding state and an unfolding state, the main temple member being formed with a projection at the pivotal end thereof;

a slide member slidably provided within the auxiliary temple and having a length permitting a base end thereof to project from the auxiliary temple member, the slide member being slidable between an engaging position and a disengaging position, and engageable with the aperture of the pivot when the auxiliary temple member is at the unfolding state;

and a compression spring disposed around the slide member in the auxiliary temple member for biasing the slide member away from the pivot when folding the spectacle frame;

whereby the projection will move the slide member to engage with the aperture of the pivot from the disengaging position to the engaging position when the main temple member is brought into the unfolded state, and the compression spring disengages the slide member from the pivot at the engaging position when folding the spectacle frame.

16. The foldable spectacle frame according to claim 15, wherein the auxiliary temple member is formed with an axial bore and opposite open ends, and a horizontal bore that is orthogonal to and in communication with the axial bore, the slide member is provided in the axial bore, and the pivot is loosely inserted through the horizontal bore, wherein the pivot is prevented from slipping off the horizontal bore by a screw.

17. The foldable spectacle frame according to claim 16, further comprising a torsion spring disposed around the pivot in the horizontal bore, the torsion spring having one end attached to the pivot and the other end engaged with the auxiliary temple member for biasing the auxiliary temple member in an unfolding direction.

18. The foldable spectacle frame according to claim 17, wherein the pivot is provided with a stop and the auxiliary temple member is formed with an abutting recess at a forward end of the horizontal bore for abutting against the stop such that the stop will limit pivotal movement of the auxiliary temple member between the folding and unfolding states and aligns the axial bore of the auxiliary temple member with the aperture when the auxiliary temple is at the unfolding state.

19. The foldable spectacle frame according to claim 15, wherein the slide member is formed with a an enlarged portion on a waist thereof and a recessed portion on a side between the enlarged portion and the base end of the slide member, through the recessed portion a pin is inserted for restraining sliding movement of the slide member.

20. The foldable spectacle frame according to claim 19, wherein the aperture has a cylindrical profile.

21. The foldable spectacle frame according to claim 15, wherein the slide member includes a projection provided at a waist portion thereof, to cooperate with a cavity formed at a lateral side of the auxiliary temple member for receiving the projection, so as to retrain sliding movement of the slide member.

22. The foldable spectacle frame according to claim 15, wherein the main temple member includes a core pivoted to the auxiliary temple member, an inner tube piece disposed around core, a main temple compression spring disposed around the core next to the inner rube piece, and an outer tube piece disposed around the main temple compression spring for preventing the main temple compression spring from slipping off, the projection being formed on the inner tube piece for moving the slide member towards the pivot when the main temple member is at the unfolding state.

* * * * *